US008600734B2

(12) United States Patent
Warner et al.

(10) Patent No.: US 8,600,734 B2
(45) Date of Patent: *Dec. 3, 2013

(54) METHOD FOR ROUTING ELECTRONIC CORRESPONDENCE BASED ON THE LEVEL AND TYPE OF EMOTION CONTAINED THEREIN

(75) Inventors: Douglas K. Warner, Gallatin, MT (US); James Neal Richter, Gallatin, MT (US); Stephen D. Durbin, Gallatin, MT (US); Greg Gianforte, Gallatin, MT (US)

(73) Assignee: Oracle OTC Subsidiary, LLC, Redwood Shores, CA (US)

(*) Notice: Subject to any disclaimer, the term of this patent is extended or adjusted under 35 U.S.C. 154(b) by 325 days.

This patent is subject to a terminal disclaimer.

(21) Appl. No.: 11/612,206

(22) Filed: Dec. 18, 2006

(65) Prior Publication Data

US 2007/0100603 A1   May 3, 2007

Related U.S. Application Data

(63) Continuation of application No. 10/266,180, filed on Oct. 7, 2002, now Pat. No. 7,289,949.

(51) Int. Cl.
*G06F 17/27* (2006.01)

(52) U.S. Cl.
USPC ...... 704/9; 704/1; 704/10; 704/231; 704/251; 704/257; 707/706; 707/707; 707/708

(58) Field of Classification Search
USPC .............. 704/9, 231, 251, 257, 256; 707/2–6, 707/706–708
See application file for complete search history.

(56) References Cited

U.S. PATENT DOCUMENTS

| | | | | |
|---|---|---|---|---|
| 4,041,617 | A | * 8/1977 | Hollander | 434/237 |
| 4,142,067 | A | * 2/1979 | Williamson | 704/258 |
| 4,931,934 | A | * 6/1990 | Snyder | 434/236 |
| 5,424,945 | A | * 6/1995 | Bell | 705/1.1 |
| 5,676,138 | A | * 10/1997 | Zawilinski | 600/301 |
| 5,768,580 | A | * 6/1998 | Wical | 1/1 |
| 5,781,879 | A | 7/1998 | Arnold et al. | |
| 5,794,050 | A | 8/1998 | Dahlgren et al. | |
| 5,819,238 | A | * 10/1998 | Fernholz | 705/36 R |
| 5,860,064 | A | * 1/1999 | Henton | 704/260 |
| 5,918,222 | A | 6/1999 | Fukui et al. | |
| 6,128,646 | A | 10/2000 | Miloslavsky | |
| 6,278,996 | B1 | 8/2001 | Richardson et al. | |

(Continued)

OTHER PUBLICATIONS

Bird et al., Intentions-to-Buy and Claimed Brand Usage, Mar. 1996, OR, vol. 17, No. 1, pp. 27-46.*

(Continued)

*Primary Examiner* — Lamont Spooner
(74) *Attorney, Agent, or Firm* — Kilpatrick Townsend & Stockton LLP

(57) ABSTRACT

A system, method, and computer program product for determining the emotional content of an electronic correspondence to route or prioritize the information, to set the expectations of a customer support worker, to flag those workers who are using inappropriate language with the customer, or to determine another best course to send the correspondence. In a preferred embodiment, a customer sends an electronic correspondence to a company via email. Emotionally charged words or symbols in each sentence are detected. The message is then given an emotional ranking which is used to determine what future action is most appropriate for the correspondence.

18 Claims, 4 Drawing Sheets

(56) References Cited

U.S. PATENT DOCUMENTS

| | | | |
|---|---|---|---|
| 6,332,143 B1 * | 12/2001 | Chase | 1/1 |
| 6,339,774 B1 | 1/2002 | Nakayama et al. | |
| 6,356,633 B1 | 3/2002 | Armstrong | |
| 6,418,435 B1 * | 7/2002 | Chase | 1/1 |
| 6,446,056 B1 | 9/2002 | Sadakuni | |
| 6,460,074 B1 | 10/2002 | Fishkin | |
| 6,622,140 B1 | 9/2003 | Kantrowitz | |
| 6,651,042 B1 * | 11/2003 | Field et al. | 704/270 |
| 6,990,457 B1 * | 1/2006 | Litman et al. | 705/5 |
| 7,089,504 B1 * | 8/2006 | Froloff | 715/839 |
| 7,099,855 B1 * | 8/2006 | Nelken et al. | 706/50 |
| 7,289,949 B2 | 10/2007 | Warner et al. | |
| 7,644,057 B2 * | 1/2010 | Nelken et al. | 706/55 |
| 7,752,159 B2 * | 7/2010 | Nelken et al. | 706/62 |
| 2002/0087498 A1 * | 7/2002 | Yoshida | 706/45 |
| 2002/0091713 A1 * | 7/2002 | Walker | 707/200 |
| 2002/0091715 A1 | 7/2002 | Coady | |
| 2002/0111811 A1 | 8/2002 | Bares et al. | |
| 2003/0069936 A1 | 4/2003 | Warner et al. | |
| 2003/0158734 A1 * | 8/2003 | Cruickshank | 704/260 |
| 2008/0040227 A1 * | 2/2008 | Ostermann et al. | 705/14 |

OTHER PUBLICATIONS

International Search Report of PCT/US02/32412 mailed on Jan. 7, 2003, 2 pages.
U.S. Appl. No. 10/266,180, filed Oct. 7, 2002, Notice of Allowance mailed Jan. 25, 2007, 8 pages.
U.S. Appl. No. 10/266,180, filed Oct. 7, 2002, Final Office Action mailed Oct. 18, 2006, 10 pages.
U.S. Appl. No. 10/266,180, filed Oct. 7, 2002, Final Office Action mailed Jul. 31, 2006, 1 page.
U.S. Appl. No. 10/266,180, filed Oct. 7, 2002, Non Final Office Action mailed Jan. 30, 2006, 8 pages.
U.S. Appl. No. 10/266,180, filed Oct. 7, 2002, Non Final Office Action mailed Dec. 17, 2004, 6 pages.
U.S. Appl. No. 10/266,180, filed Oct. 7, 2002, Final Office Action mailed Apr. 21, 2004, 6 pages.
U.S. Appl. No. 10/266,180, filed Oct. 7, 2002, Non Final Office Action mailed Aug. 1, 2003, 8 pages.

* cited by examiner

METHOD FOR ROUTING ELECTRONIC CORRESPONDENCE BASED ON THE LEVEL AND TYPE OF EMOTION CONTAINED THEREIN

CROSS REFERENCE TO RELATED APPLICATIONS

This application is a continuation of and claims priority to co-pending U.S. patent application Ser. No. 10/266,180, filed on Oct. 7, 2002, which application is hereby incorporated by reference to the extent permitted by applicable law.

BACKGROUND OF THE INVENTION

This invention relates to a variety of problems including the inefficient routing of electronic correspondence, such as electronic mail (email), sent from customers to a company.

Email has developed into a convenient medium for customers to provide feedback concerning a company's products and/or services. Customers are often more candid in their assessment of a company's products and services when shaped a physical or even oral confrontation with a company representative. Large business entities are commonly inundated with either solicited or unsolicited email feedback. Adequately and efficiently processing this massive amount of data has typically been a time intensive and expensive process. An automatic method of routing email based on its emotional content would ease the burden on the company.

A company must employ some means to route its customers' electronic correspondence to appropriate personnel. A company may create a department to read each piece of email to determine the best route of the message, whether that be to a customer service representative (CSR), a CSR's supervisor, a public relations representative, normal routing, or other appropriate path. The time associated with physically reading each email compounded by the expense of maintaining such a department would make a company less nimble and responsive to consumer demands.

In another variation, customer e-mails can be summarized based on keywords. These summaries would reduce the amount of words that must be read, however the process is not automatic and important words can be left out of the summary. Having to read even the summaries is not an optimal use of a department's resources.

A CSR often relies on observing the physical demeanor of a customer to determine who is the best person to handle the situation. If a CSR receives a phone call from a disgruntled customer who speaks loudly and forcefully, that customer may be transferred directly to the CSR's supervisor to more adequately address the customer's concerns. Unfortunately, a CSR cannot observe the physical demeanor of a customer who sends an email. Stripped of this emotional gauge, a company must allocate substantial resources to route customer concerns.

Eudora 5.1's Moodwatch™, which was created by Qualcomm Incorporated, a Delaware corporation, is an application that classifies documents based on the document contents. More specifically, MoodWatch™ is a new language tool that acts as an emotion monitor for email that flags aggressive language and calls it to the author's attention. MoodWatch™ can detect aggressive, demeaning or rude language in the email by looking at both individual words and complete phrases. However, MoodWatch is used only to warn or alert a person of potentially offensive messages. It makes no decisions based on its alerts and does not gauge positive messaging.

In summary, the prior art provides means to manually read email and then manually determine the best person or department to act on the email. Means also exist to electronically gauge the offensiveness of email content. This art can be improved by a system that gauges both positive and negative emotion within email and then uses that determination to automatically route the email message to an appropriate company representative. Workflow routing based on the detected emotion enables a company to provide a high level of service to its customers in a more cost efficient and less time intensive manner.

SUMMARY OF THE INVENTION

The foregoing problems are overcome by the present invention. In one aspect of the invention, both positive and negative emotions are determined in a customer's incoming email. This process is language independent. First, a speech tagger designates each word as an adjective, noun, verb, adverb, etc. Thereafter, a language parser identifies noun phrases and verb phrases and other relevant features of the language. Each word and phrase is then assigned an emotion value. Next, a fuzzy logic mapper applies transformation rules to assign an emotional ranking to the email message. Finally, the emotional ranking is used to determine what future actions are most appropriate for the correspondence. These actions include, but are not limited to, routing the email to an appropriate person or to an automatic responder, setting a priority on the message, ignoring the message, or completing some other action such as appending associated information or sending a conformation to the sender. Reports may also be generated based on the ratings.

BRIEF DESCRIPTION OF SEVERAL VIEWS OF THE DRAWINGS

The present invention is described in detail below with reference to the attached drawing figures, wherein.

DETAILED DESCRIPTION OF THE INVENTION

The present invention provides a method and system for routing electronic correspondence based on the emotional content of the correspondence.

For illustrative purposes, an embodiment of the present invention is discussed below with reference to a company customer support department that accepts email as a means of customer communication. This is only one example of a suitable environment and is not intended to suggest any limitation as to the scope of use or functionality of the invention. Neither should it be interpreted as having any dependency or requirement relating to any one or a combination of components illustrated in the exemplary operating environment.

Figure 1:
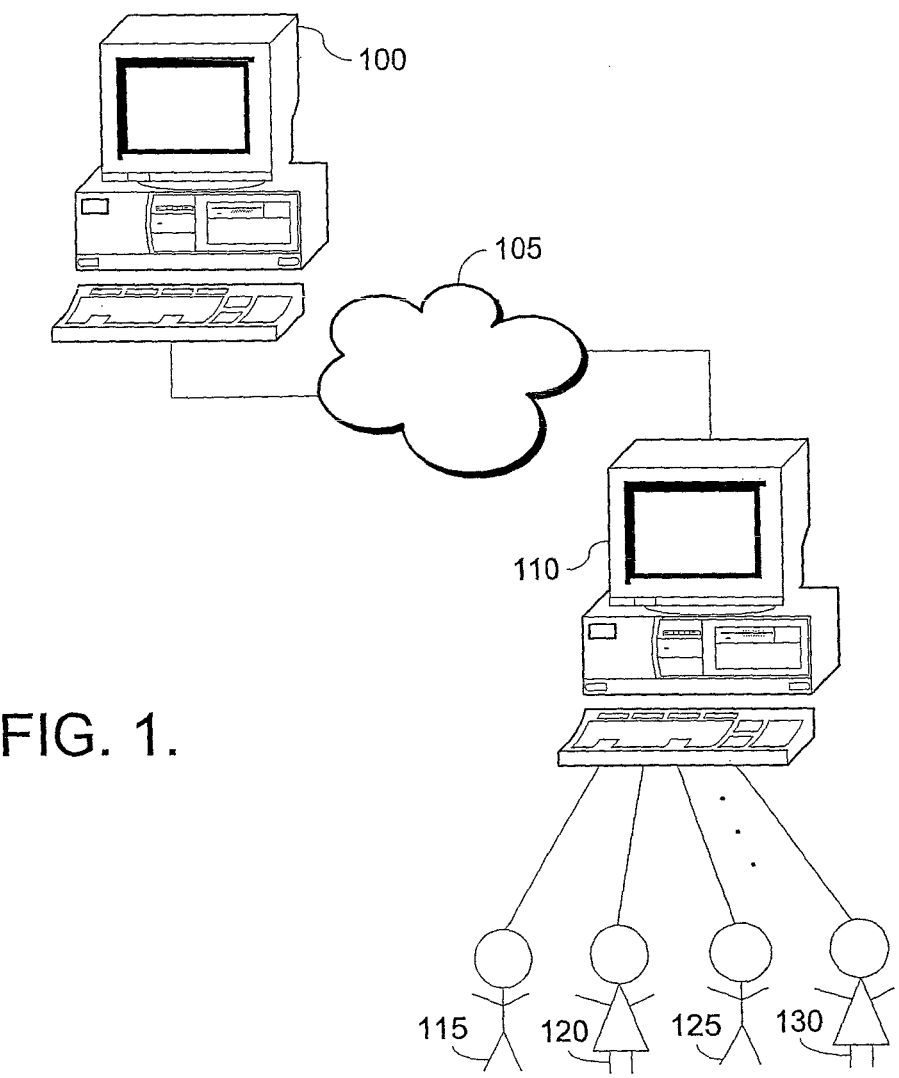
FIG. 1 depicts the overall architecture of an embodiment of the present invention comprising a customer's computer and a company's servers connected via a data network.

Referring to the drawings, FIG. 1 illustrates one embodiment of the invention. A company receives and transmits customer electronic correspondence including email from an email server 110 via a data network 105 connected to a customer's computer 100. In a preferred embodiment, the data network 105 can be the Internet. Electronic correspondence contemplates but is not limited to email, chat and web-based forms. The email server 110 is merely one of a myriad means a company may employ to send and receive email. The email server 110 may be individual workstations or a network of servers. Electronic correspondence received from a client computer 100 via the Internet 105 initiates the process of the present invention. The process of the present invention is illustrated and described with reference to FIGS. 2a and 2b.

As shown, an e-mail message is received at step 200. At step 203, the processing of the email message begins. Initially, at step 206, each word in the email message is tagged with its corresponding part-of-speech. A part-of-speech tagger assigns tags such as noun, verb, adjective, adverb, etc., to each word of the email message. Next, a language parser identifies noun phrases and verb phrases along with other relevant features of the language at step 209. The parser ensures that a phrase such as "not happy" carries the same meaning as the word "unhappy" and that negation operators such as "not" are prevented from mistakenly labeling irate customers as those that are quite pleased.

Next, individual words and word-phrases are referenced against a lookup table at step 212. The referenced information is used to assign an emotion value to the individual words and word-phrases at step 215. Symbols within a message can also be given emotion values. For example, emoticons which are punctuation strings such as :-) to denote happiness and :-( to denote sadness can be assigned an emotion value. In other words, emoticons are symbols that the system may use also to determine an overall emotional ranking at step 224. At step 218, modifier words such as "very" are identified.

Further, capitalization, punctuation, and other features are detected at step 221. In a preferred embodiment, words that have all of their letters capitalized can signify yelling. Serial exclamation points can signify a forceful tone. Thus the system can recognize the difference in degree of emotion between someone writing, "I am not very happy," and "I am NOT VERY HAPPY!!!"

A series of transformation rules are applied at step 222 to the email message contents. The transformation rules can include such things as associating a word and rating with the action of assigning a message to a particular individual. Alternately, transformation rules can involve the conversion of a word value from a scale of –100 to 100 to a scale of –3 to +3. In order to reduce non-linearity in ratings and to easily convey information to a user, a mapped emotional ranking is assigned to the message using a fuzzy logic mapper at step 224. Thus, a scale of between –100 and +100, or any derivative thereof, can be used but the emotional rankings are mapped in the range from –3 to +3, which makes graphically depicting relevant emotional information easier by having only seven levels of satisfaction to visually display. The fuzzy logic mapper can be used to account for a non-linear rating scale. For instance, if the marginal dissatisfaction from –90 to –100 is greater than the marginal dissatisfaction from zero to –10, the fuzzy logic mapper will properly map the larger values to smaller values and accurately assign an emotional ranking at step 224 to the message.

The workflow processing begins at step 227. Workflow processing is the process whereby the route of the electronic correspondence is determined based on the emotional metrics described above. Emotional content of the electronic correspondence is used to route or to prioritize the information, to set the expectations of a customer support worker, to flag those workers who are using inappropriate language with the customer, or to determine an alternate best course for the correspondence.

Initially, a determination is made whether to assign a new priority status at step 230. At step 223, a determination is made whether to assign new ownership to any one of the individuals within a company. An example of such individuals includes a customer service representative 120, supervisor 115, manager 125, or any other appropriate individual 130 as illustrated in FIG. 1. At step 236, a determination is made whether to assign a new service level and, at step 239, a determination is made whether to assign secondary information to the message. Next, at step 242, a confirmation, can be sent to the user which may be prior to or in addition to a sending an auto-response at step 245. A determination is made on whether or not to notify a manager at step 247. Following workflow processing, the message can be deleted as shown at step 250 or preserved for future reference as shown at step 253. The outcome of all of the message processing and workflow processing that has been discussed thus far can be stored for later retrieval. This function is illustrated at step 256, wherein data can be logged for further report generation.

An array of information can be gathered, stored, and processed to provide business with data to base improvements. One key datum is the final emotional ranking assigned to a message or closed case. A case may be a series of correspondence from the customer to the company regarding a particular issue. For a case, the order in which the messages are received is important. The system and method of the present invention can account for the temporal sequence of messages. That is, the most recent email from a customer is treated as a better indicator of his or her level of satisfaction than a prior message.

For example, a user's initial message may open a case and be assigned an emotional ranking of –10. After a customer support representative (CSR) answers the question, the customer may send a response which receives a ranking of +50. The system could employ a time-scale weighted average that would weight the more recent +50 ranking more than the earlier –10 ranking, along with the aforementioned factors, to produce an overall satisfaction ranking that is in close accord to the customer's current frame of mind.

Many other metrics can be gathered including the overall language usage of the company's customer support representatives, historical pleased resolution rate, and historical degree of customer satisfaction. This data is stored and able to be recalled for generating reports. Finally, some other external action can be performed on the message as shown at step 259.

Figure 2A:
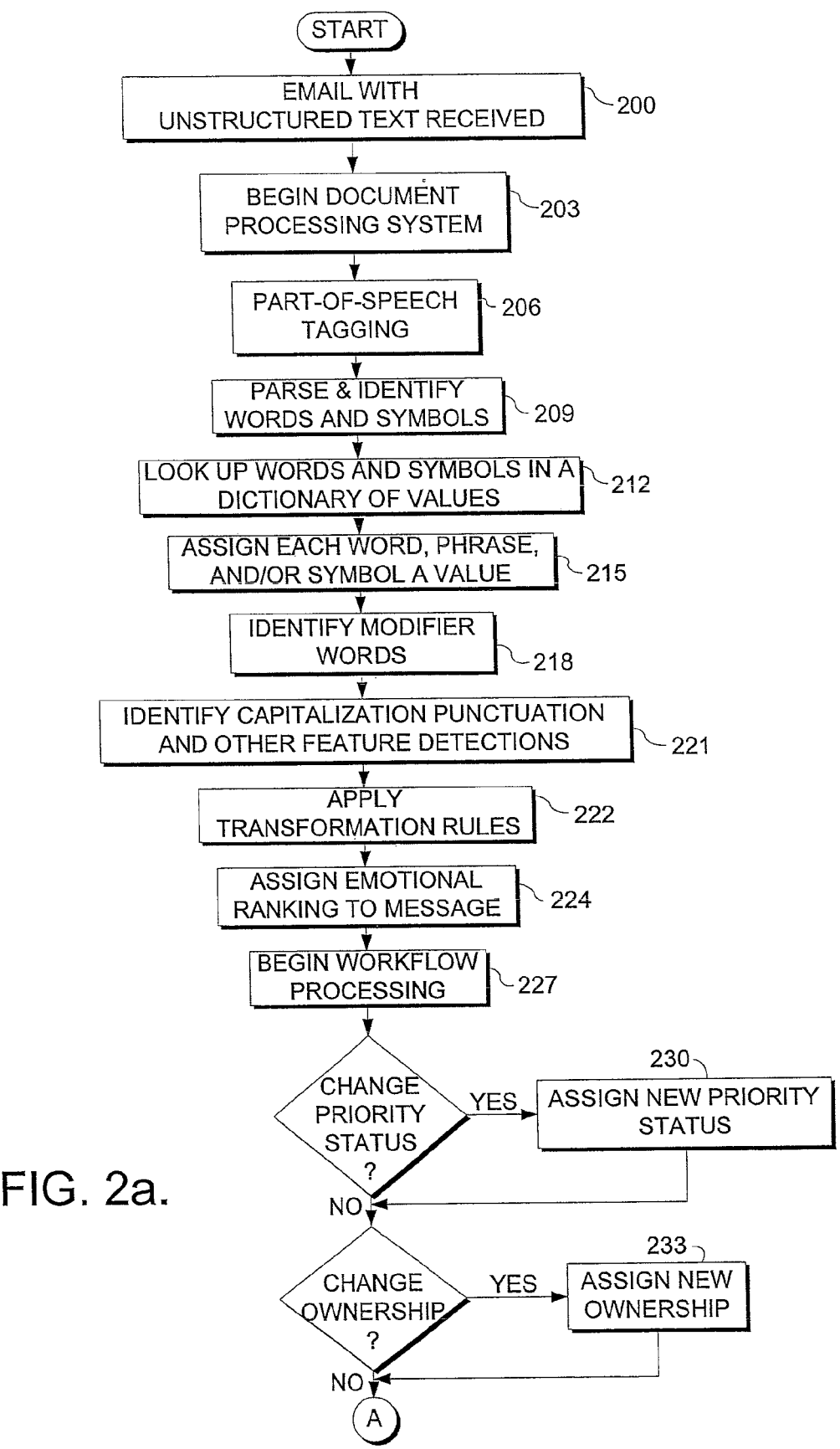
FIG. 2a and 2b are a flow chart depicting operation of an embodiment of the present invention.
Figure 2B:
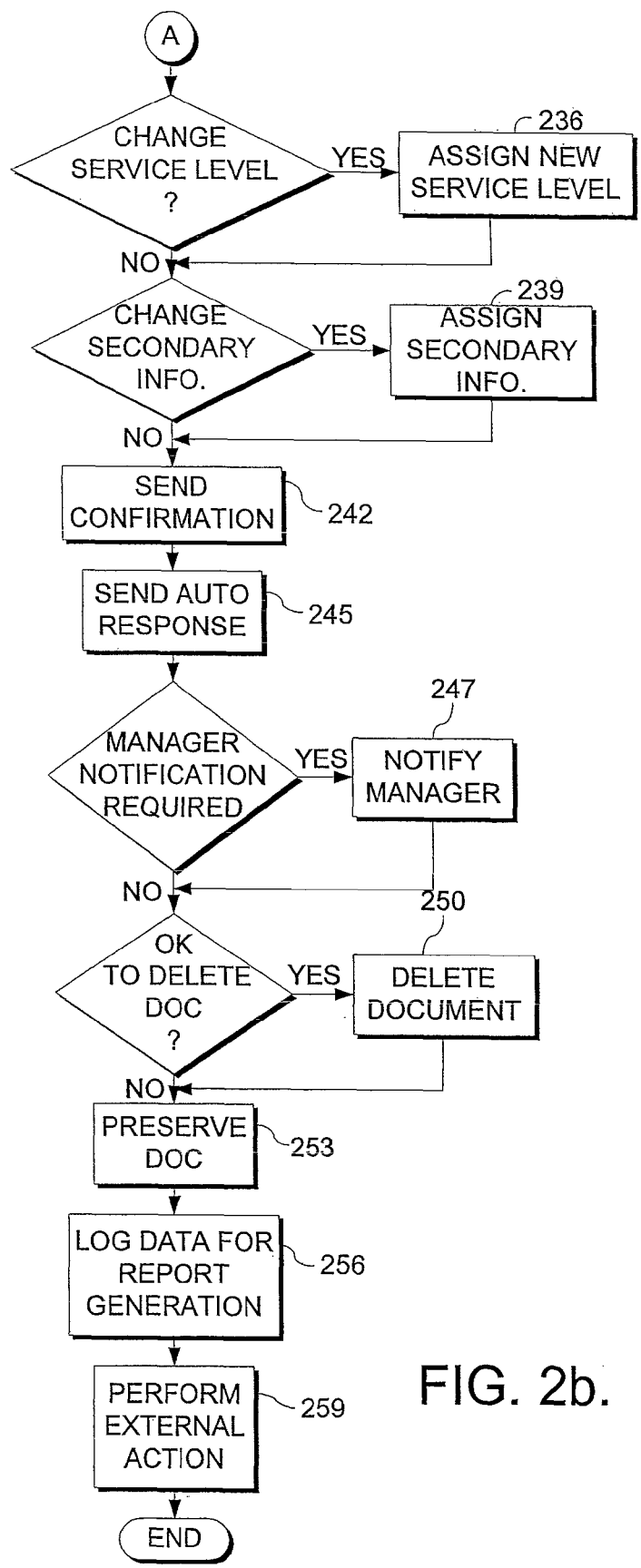
Figure 3:
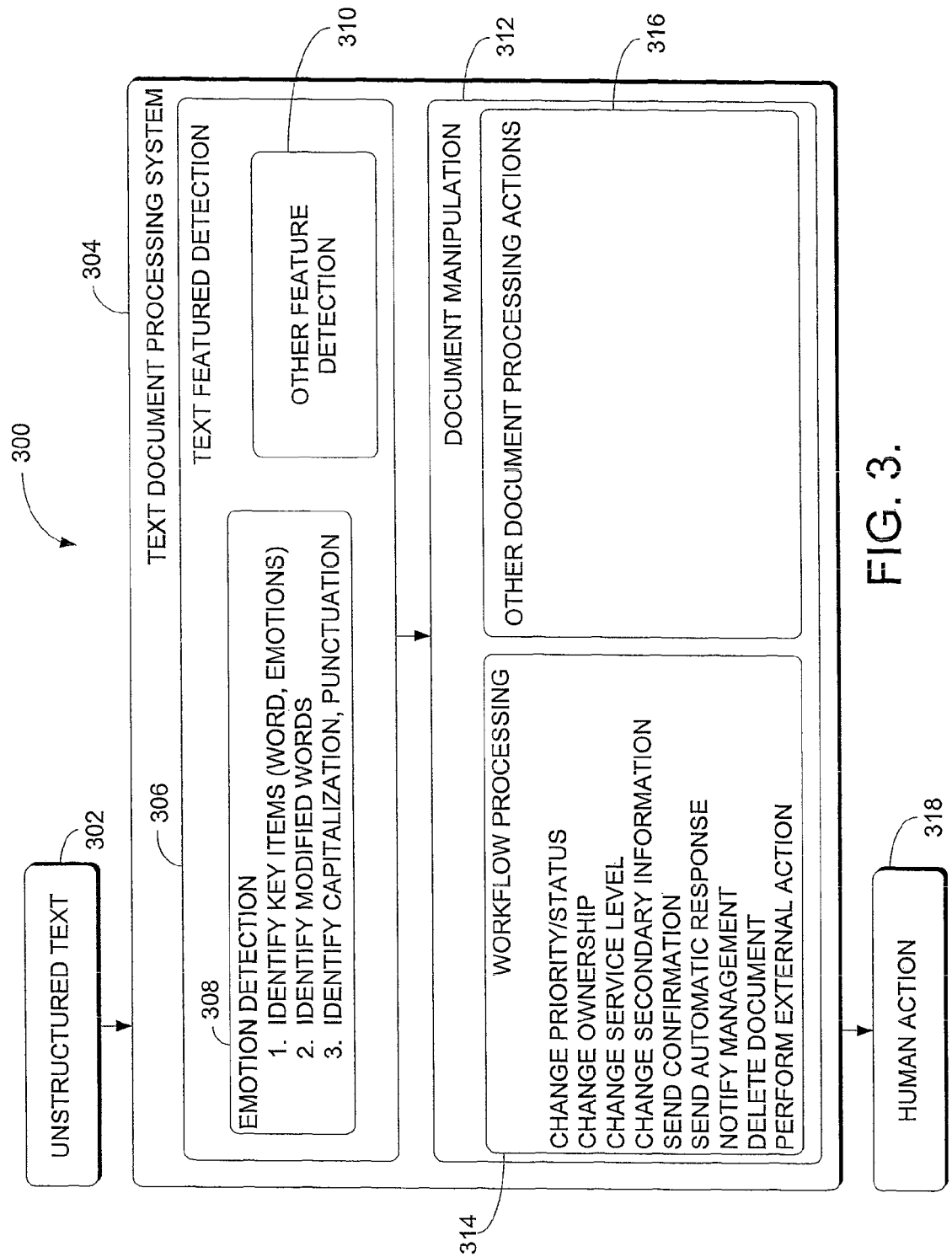
FIG. 3 is an overview of the component parts of an embodiment of the present invention.

The present invention comprises multiple components and functions which have been described with reference to FIGS. 1, 2a and 2b. A block diagram illustration of an embodiment of the present invention is further presented in FIG. 3 and generally referenced as routing system 300.

Routing system 300 illustrates and groups in a pictorial manner, the functions, features and processes that are involved with the system and method of the present invention. Generally, at a high level, unstructured text 302 is piped into a document processing system 304, which then provides an output for human action 318.

Document processing system 304 provides the functions described earlier with respect to FIG. 2. System 304 comprises a text feature detection component 306 and a document manipulation component 312. The text feature detection component 306 includes both an emotion detection component 308 and an other features detection component 310. In practice, the emotion detection component 308 performs identification of key items (e.g., words and emoticons), word modifiers, and punctuation or capitalization within a message.

Document manipulation component 312 includes another document processing component 316 for processing system actions and a workflow processing component 314. The workflow processing component 314 incorporates processing such as changing the priority or status for a given message, changing ownership, changing service level or changing the secondary information pertaining to the message. In addition, workflow processing component 314 performs other types of processing such as those relating to confirmations and the automated response to messages. Other features and aspects of the present invention that relate to external actions such as notification of a manager or deletion of a document, can also be considered a part of workflow processing. In other words, all workflow rules and escalation rules associated with the present invention are provided by the workflow processing component 314.

The culmination of all non-automated functions performed by the document processing system 304 is the provision of information for action by a human user. This function is illustrated as human action 318. For example, when a message is deemed by the document processing system 304 to be from an unhappy customer, the message is routed to an appropriate customer support representative for their action.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

The invention claimed is:

1. A multi-language method for routing electronic correspondence to personnel or entity having a potential interest in the emotional content of at least one or more words or symbols within said electronic correspondence, said method comprising:
   receiving said electronic correspondence;
   analyzing said electronic correspondence to determine an emotional ranking for said correspondence including:
      determining from a plurality of languages a language used in said electronic correspondence,
      applying language specific tagging to each word of said electronic correspondence with their respective parts-of-speech for said language,
      applying language specific parsing of said electronic correspondence into noun phrases and verb phrases for said language based on the tagging of each word of said electronic correspondence,
      applying transformation rules to said parsed electronic correspondence to produce an emotional ranking for said electronic correspondence, wherein producing the emotional ranking for the electronic correspondence includes assigning to each phrase and one or more symbols in the electronic communication an emotion value, wherein the one or more symbols comprise punctuation strings of one or more characters which together with the phrases denote emotion, and wherein the emotional ranking comprises a time-scaled weighted average of the emotional values, and assigning a priority to the electronic correspondence based on the emotional ranking; and
   workflow routing said electronic correspondence to one of said personnel or entity more likely having said potential interest in the contents thereof for further action based on said emotional ranking and the assigned priority.

2. The method of claim 1, wherein said emotional ranking is determined by a customer's satisfaction with a company's products or services.

3. The method of claim 1, wherein said further action comprises at least one of the following actions:
   routing said electronic correspondence to an appropriate person based on said emotional ranking;
   setting the expectations of one or more recipients;
   flagging said one or more recipients who are using inappropriate language with said customer; or
   determining another best course to send said electronic correspondence.

4. The method of claim 3, wherein the electronic correspondence is from a customer service representative to a customer.

5. The method of claim 1, further comprising the steps of:
   storing a collection of said emotional rankings;
   performing mathematical calculations on an individual or a collection of said emotional rankings to generate statistics; and
   generating one or more of a plurality of reports based on said statistics.

6. The method of claim 1 wherein said emotional ranking is conveyed in a numeric range.

7. The method of claim 1 including the steps of:
   responding to said electronic correspondence in a manner related to said emotional ranking; and
   rerouting said response if said emotional ranking of said response has a negative emotional value.

8. The method of claim 1, including the step of assigning an emotional value to said electronic correspondence using a reference data structure.

9. The method of claim 8 wherein said emotion value is in a range that spans from a negative value to a positive value.

10. The method of claim 8, wherein said referenced data structure is a table, spreadsheet, or database having said emotional values associated with predetermined words of emotional content.

11. The method of claim 8, wherein said step of assigning an emotional value to said electronic correspondence using a referenced data structure, further comprises:
   determining whether one or more words, phrases, or symbols of said electronic correspondence is located within said referenced data structure; and
   retrieving said emotional value based on said one or more words, phrases, or symbols having a match within said referenced data structure.

12. The method of claim 8 wherein said emotion value is reflective of both positive and negative emotions.

13. A method as recited in claim 12 further comprising routing the electronic correspondence as a result of said emotional ranking.

14. A method as recited in claim 12 wherein said emotional ranking is derived by a fuzzy logic reduction process, which reduces the non-linearity of individual work ratings and simplifies the conveyance of information to a user.

15. The method of claim 1, wherein the electronic correspondence is from a customer to a customer service representative.

16. A multi-language method in a computing environment for routing an electronic correspondence based on the level and type of information contained within the electronic correspondence, the method comprising:
- determining from a plurality of languages a language used in said electronic correspondence;
- applying language specific tagging to each word of said electronic correspondence;
- applying language specific parsing of said electronic correspondence based on said tagging to parse the electronic correspondence into a plurality of words and phrases;
- assigning one or more values to each of the words or phrases and one or more symbols in the electronic correspondence, wherein the one or more symbols each comprise a punctuation string of one or more characters which together with the phrases denote emotion;
- utilizing said one or more values to provide an emotional ranking and priority for said electronic correspondence, wherein the emotional ranking comprises a time-scaled weighted average of the emotional values; and
- workflow routing said electronic correspondence to personnel having an interest in taking action based on said correspondence as a result of said priority and emotional ranking of the contents thereof.

17. A method as recited in claim 16 further comprising utilizing said emotional ranking to prioritize said electronic correspondence.

18. A method as recited in claim 16 wherein said emotional ranking is derived by a fuzzy logic reduction process, which reduces the non-linearity of individual word ratings and simplifies the conveyance of information to a user.

\* \* \* \* \*